(12) United States Patent
Longtin

(10) Patent No.: US 6,786,028 B1
(45) Date of Patent: Sep. 7, 2004

(54) ILLUMINATIVE SAFETY GARMENTS FOR WORKING ANIMAL

(75) Inventor: Deborah L. Longtin, Feura Bush, NY (US)

(73) Assignee: Animal Safety Products, Inc., Mansfield, OH (US)

( * ) Notice: Subject to any disclaimer, the term of this patent is extended or adjusted under 35 U.S.C. 154(b) by 0 days.

(21) Appl. No.: 10/456,447

(22) Filed: Jun. 6, 2003

Related U.S. Application Data

(63) Continuation-in-part of application No. 10/223,737, filed on Aug. 20, 2002, now Pat. No. 6,574,948, which is a continuation-in-part of application No. 09/967,687, filed on Oct. 1, 2001, now abandoned.

(51) Int. Cl.[7] .............................. B68C 5/00; A42B 1/18
(52) U.S. Cl. ........................ 54/79.2; 54/80.4; D30/145
(58) Field of Search .......................... 119/850; 54/79.1, 54/79.2, 79.4, 80.4; 2/94; D30/145

(56) References Cited

U.S. PATENT DOCUMENTS

| | | | |
|---|---|---|---|
| 215,983 A | 5/1879 | Simpson | |
| 228,019 A | 5/1880 | Ayres | |
| 243,040 A | 6/1881 | Hand | |
| 4,214,421 A | 7/1980 | Battle et al. | |
| 5,060,458 A | 10/1991 | Curtis | |
| 5,535,447 A * | 7/1996 | Stevens et al. | 2/4 |
| D372,563 S | 8/1996 | Waugh, Jr. | |
| D374,315 S | 10/1996 | Caditz | |
| 6,089,194 A | 7/2000 | LaBelle | |
| 6,128,891 A | 10/2000 | McMahon | |
| 6,233,738 B1 * | 5/2001 | Siracusa | 2/4 |
| 6,574,948 B2 * | 6/2003 | Longtin | 54/79.2 |

* cited by examiner

Primary Examiner—Charles T. Jordan
Assistant Examiner—Elizabeth Shaw
(74) Attorney, Agent, or Firm—Fredric T. Morelle

(57) ABSTRACT

Lightweight, insect-barrier garments of reflective/illuminative, moisture wicking or otherwise breathable covering for protection of a quadruped animal. An ensemble of from one to three garment sections is provided to cover portions of the animal's body that are susceptible to harassment by biting or stinging insects. Illuminative character is present in the invention in modes and at locations that attain the highest profile of visibility, in respect of ambient visibility and the task to which the animal is placed, e.g. daylight/dusk, under saddle, hunting, turnout, etc. A bonnet section of the ensemble, with the neck section, is fashioned to stand away from the animal's eyes, thereby protecting its sight by providing a protective insect-resistive guard or debris barrier.

18 Claims, 6 Drawing Sheets

ILLUMINATIVE SAFETY GARMENTS FOR WORKING ANIMAL

CROSS-REFERENCES TO RELATED APPLICATIONS

This is a Continuation-in-Part of application Ser. No. 10/223,737, filed by the same inventor on Aug. 20, 2002 now U.S. Pat. No. 6,574,948, of the same title, which application was a Continuation-in-Part of application Ser. No. 09/967,687, filed by the same inventor on Oct. 1, 2001 abandoned, entitled: High Visibility Fly Gear, now abandoned.

STATEMENT REGARDING FEDERALLY SPONSORED RESEARCH OR DEVELOPMENT

Not Applicable

BACKGROUND OF THE INVENTION

1. Field of the Invention

This invention pertains, generally, to very lightweight safety and protective garments for working animals. The garments provide comfortable protection to such animals against insect (primarily biting flies) harassment as well as possessing high visibility, illuminative and identification indicia on any individual garment. Specifically, the invention provides an ensemble, consisting in an unitary or assemblage of garments that are constructed so as to cover, or drape, discrete portions of a working animal's body and which (independently) provide protection against biting insects, while presenting, for use during times of low or obscured visibility, superficial illuminative indicia for identification.

2. Discussion of Relevant Art

Several documents have been found that disclose various attempts to provide animal clothing, or garments, that would afford the general characteristics stated above, namely safety and fly-resistive protection; however none appear to show high visibility, illuminating apparatus. The most relevant of these documents have, as they appear to the instant inventor, both advantages and limitations as hereinafter discussed.

In U.S. Pat. No. Des. 374,315, issued Oct. 1, 1996 for PROTECTIVE GARMENT FOR CANINES, there is shown a complete cloaking for a dog that covers the animal from crown to tail, stopping just short of covering the tops of the paws. The garment appears to be for warmth, but such a determination of utility is beyond the scope of the design patent. There is no showing of illuminative indications or paraphernalia.

The garment morphology shown in U.S. Pat. No. Des. 372,563, issued Aug. 6, 1996 for PROTECTIVE DOG GARMENT, is similar to one of the varied canine coverings of the instant invention. Again, with the design patent, actual utility is unspoken and there exists some ambiguity whether this is a garment for a "protective" (i.e., protection) dog or a protective garment for a dog. The instant invention's intent is not served by the "leggings" shown in this patent and in U.S. Pat. No. Des. 374,315; and there appears in neither the above-mentioned paraphernalia.

A REVERSIBLE HEAT-REFLECTIVE PET GARMENT is disclosed in U.S. Pat. No. 6,089,194, issued Jul. 18, 2000. This article covers the chest, flanks and back of a dog with a reversible cover that presents, outwardly, an alternate heat-reflective or water-repellant surface. The garment resembles yet another of the garment variations entertained by the present invention, but because of its non-porous composition, it is limited to use in only extreme hot/cold or wet climes.

Similar to the article of U.S. Pat. No. 6,089,194 is that disclosed in U.S. Patent No. 5,060,458, issued Oct. 29, 1991 and entitled: PROTECTIVE DOG COAT. This is a relatively heavy coat, for a dog of any type, which affords warmth and the addition of highly visible coloring. There is shown no other means for either identification or comfort.

One of the most relevant article found, relative to the instant invention, is seen in U.S. Pat. No. 6,128,891 ('891), entitled: PROTECTIVE HORSE MASK. Although confined to but a portion of a horse's head, this device, by use of a lightweight mesh fabric and fleece, provides face, ear and nostril protection against both sun and noisome insects. Although the device is perceived to be well suited, to its task, the patent falls short of suggesting that the stated protection be applied to the preponderance of the animal's body. The mask also lacks means for rendering the animal highly visible.

Although coverings for animals are quite plentiful, the instant inventor has not been apprised of a garment for working animals, particularly horses under saddling gear, or dogs, that possesses lightweight, extensive covering, which affords to the animal excellent ventilation, optional fly protection and especially high visibility during low-light conditions.

Several other disclosures show forms of protective garments for equines and canines that will be listed in the References Cited. Most show breathable fabrics or turnout garments and particular shapes; but all fall short of the salient aspects of the instant invention, which can be realized in one or a plurality of safety garments.

Incorporation by Reference

The U.S. Pat. No. 6,128,891, issued to McMahon on Oct. 10, 2000 for a PROTECTIVE HORSE MASK is incorporated by reference for its showing of a partial head covering for a horse, said covering consisting in the combination of lightweight, fine mesh and fleece fabrics

Definitions

Most terms used herein are to be taken as having their customary English meaning. When different or secondary meanings may be applied, the inventor has, with their first usage, employed quotation marks and given their intended definition in parentheses. A few terms, however, are to be read with the following meanings (especially in the claims):

breathable—having capability of ventilation or being evapotranspirative;

ensemble—an assemblage of parts (as in a set of clothing);

evapotranspirative—having the properties of liquid absorption and evaporation;

fluorescence—luminescence that may persist after removal of excitation;

illuminati(on)(ve)—practically speaking, any kind of light or light producing (def. illuminative).

iridescence—brilliance or high reflectance of light;

luminescence—emission of visible light after non-thermal energy stimulation; and saddling gear—the saddle, including cinching and accouterments for attachments.

BRIEF SUMMARY OF THE INVENTION

The instant inventor has overcome deficiencies of the early art by providing an ensemble of illuminative/ illuminated, well ventilated, insect-resistive garments for working animals, such as horses (especially under saddling gear) or field dogs. Dual safety objectives are satisfied by this invention: first, prevention of animal harassment by biting insects such as deer/black/horse flies, which could cause a horse to stumble or a dog to turn into line of fire; and second, identification of the animal (and rider or master) during conditions of low ambient light. Hereinafter, the descriptions of the invention and its maximum benefits will be described, principally, in respect of the horse, donned with saddling gear (or under saddle): however, the invention is adaptable for use by most equine and canine creatures, while at task or leisure (i.e., at pasture or roaming).

The first of these objectives is attained, in varying degree, by cloaking portions of the animal in a single garment or a plurality of garments, the latter ensemble being preferred, but not required. Garments of the ensemble are constructed of lightweight, breathable mesh fabrics of the type that are used for their ventilation or moisture-wicking properties. Moreover, the fabric used by the inventor is produced, and available off the shelf, in iridescent colors. Under fair weather and light (normal) ambient conditions, the ensemble provides: a hood (head covering); a hood-connected cape (neck covering), which descends to the withers and is attached to the saddling gear; and a body drape, consisting in a single garment attached, to saddling gear, so as to cover the horse's flanks, back and rump laterally and rearward of the saddling gear. The garment fabric is of a mesh small enough to frustrate the common biting flies, yet large enough to "breath"—in the preferred embodiment, having foramen size from about 0.5 mm to about 1.5 mm. The bonnet portion (head cover) of the ensemble stands off the eyes of the animal, thereby providing to them an insect-and light debris-resistive guard or barrier protection. Under such (normal) conditions, both safety objectives of the invention are met when the iridescent fabric is used.

To achieve the second objective, under less than optimum visibility conditions, there is provided, on discrete sites of the garments, a series of illuminative strips or patches. Several fabrics of luminescent, fluorescent or otherwise highly reflective character are readily available, on the market. These indicators, or illuminative indicia, are affixed by sewing/stitching, snap fasteners or, like the preferred method of connecting the above garments, by use of materials bearing hooks and loops, as in the product Velcro®.

BRIEF DESCRIPTION OF THE SEVERAL VIEWS OF THE DRAWINGS Of the Drawings.

DETAILED DESCRIPTION OF THE INVENTION

This disclosure is made in great detail, predicating elements superfluous to the primary objective—that of affording protection from biting insects. In its most basic mode, only the ensemble, in breathable or evapotranspirative, mesh material need be considered, in order to provide that protection. Further, in a de minimus application, only head and neck of the animal are protected, they being the most sensitive areas.

Figure 1:
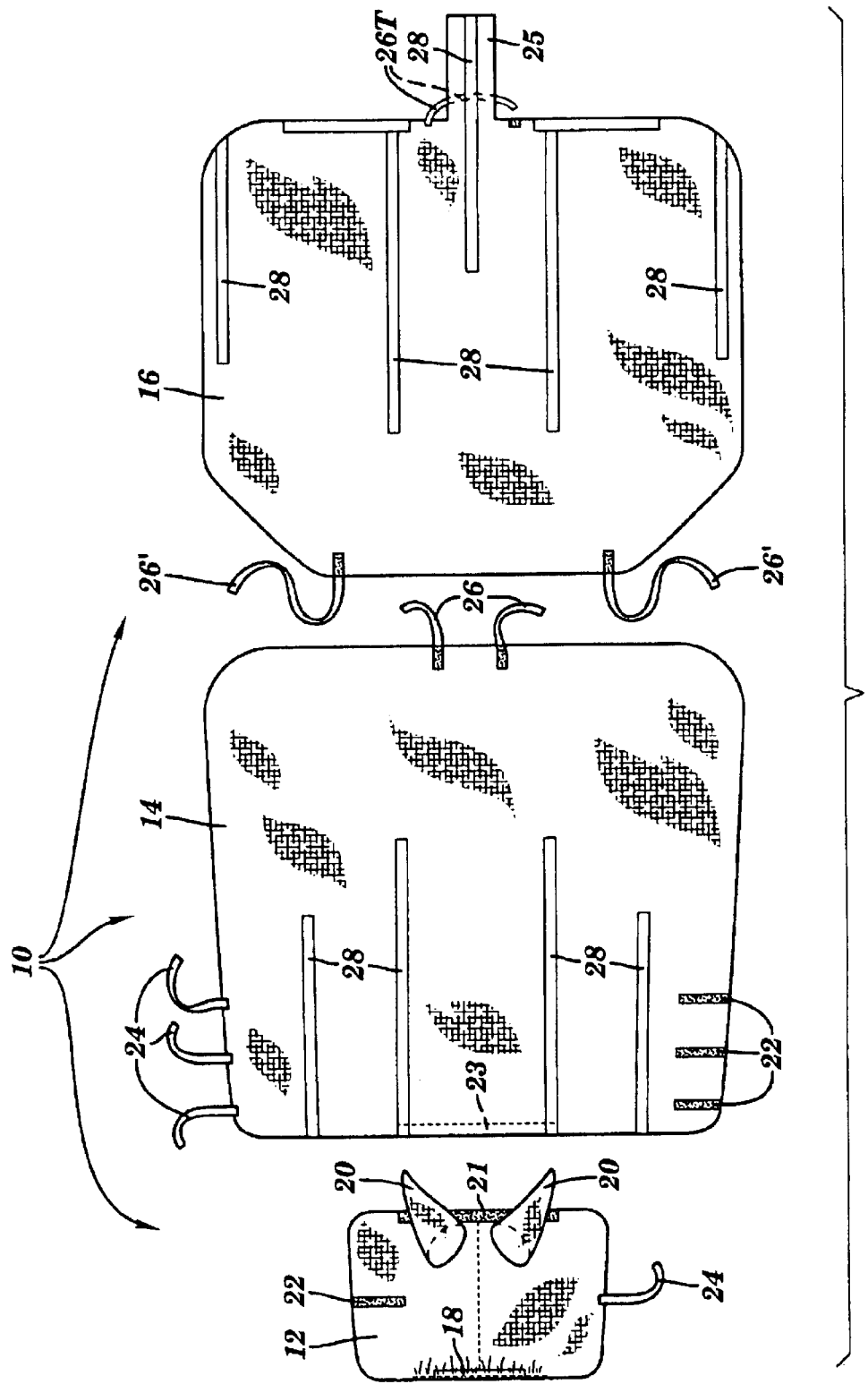
FIG. 1 is a plan view of the three garments of the invention.

Reference being had to FIG. 1 of the Drawings, the invention 10 is laid out schematically, in the horse/equine ensemble. Irrespective of actual sizing, which varies with breed and size, the ensemble consists, nominally, in two or three garments, the latter being shown. To achieve maximum visibility, under normal daylight conditions, the garments are colored in an iridescent color such as international orange, an identification/safety color which is known among sportsmen as "blaze orange"; however, other high visibility, iridescent or fluorescent colors are also used. The reader is apprised that, depending on the particular animal and desired degree of garment "customization" (special sizing/fitting), two or all of the garments may be rendered as one, or a single piece, bearing the illuminating articles, may be opted. For the sake of brevity and clarity in disclosure, only the invention's two-part (head and neck coverings only) and tri-part garment for equine and canine animals will be addressed, but other combinations are self-evident.

Continuing in FIG. 1, the invention 10 is displayed, serially, as the headpiece, or Sonnet 12, the neck cape 14, and the laterals and rear cover 16 (hereinafter, "rear cover"). Referring to the bonnet 12 structure, there are provided a hem gather 18, a pair of projecting, conical ear covers 20 and attachment strips 22 and straps 24 that include opposable book and loop material (hereinafter, Velcro®). There is an additional Velcro® mechanism 21 for attaching the bonnet to the cape (here only, uniquely numbered).

The cape 14 is provided in size ample enough to allow the horse to lower its head for grazing. It is readily apparent that a different shape, as well as size, would be made for a non-grazing animal such as the canine (see FIG. 6). The rear cover 16 is likewise sized for the particular working animal and has a tail extension 25, specifically for the equine model. Velcro® attachment mechanisms 23, the cape hem (underside) that mates to the bonnet strip 21, cape securing strips 22 and straps 24, as well as under-the tail tie 26T are shown; their actual utilization will be highlighted in figures that follow. Final to FIG. 1, there are shown: ties 26, 26' and 26T, which possess both Velcro® hooks and loops; and, a plurality of illuminative indicia 28 that are strategically placed on the garments so that, under visibility conditions less than optimum, the animal's presence can be detected when the indicia are excited by an energy source. Many illuminative materials are available on the market and offered in variously shaped, adhesive or sew-on modalities. The inventor uses a tape product sold as Scotchlite®, an aluminized, highly reflective fabric. It should be realized also that the straps/ties might be made of an elastic material.

Figure 2:
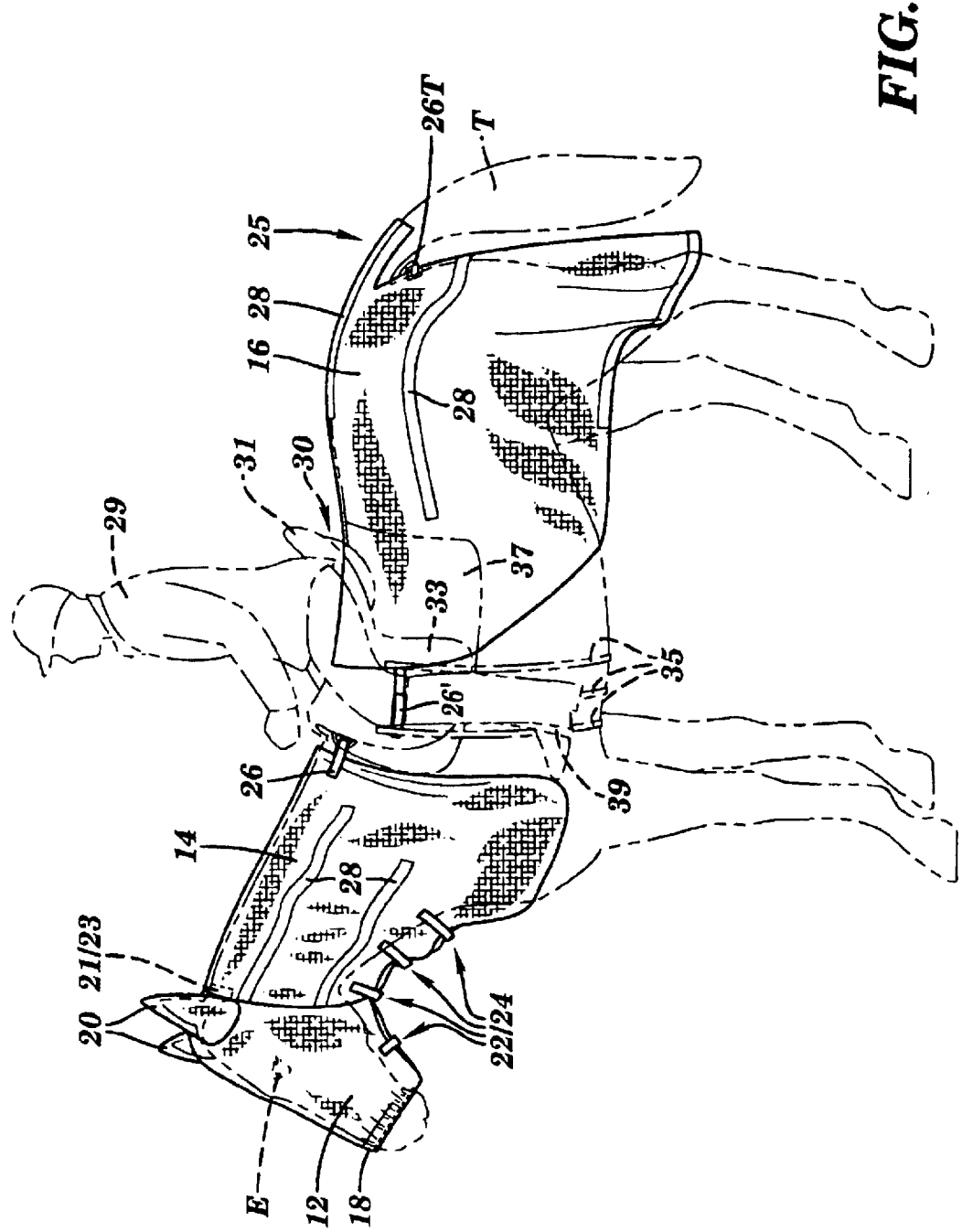
FIG. 2 is a side elevation sketch of a horse donned with the invention.

FIG. 2 depicts a horse 27, rider 29 and the saddling gear 30, all shown in phantom. The saddling gear includes: saddle 31, lateral, descending flaps(s) 33; cinch strap 35; saddle blanket 37 and, stirrup(s) 39. The cape 14 and rear cover 16 attach to saddling gear parts, except the blanket and stirrups. The bonnet 12 is donned first by passing the ears into the cones 20 and securing the straps 24 to strips 22, under the horse's throat. Note that this shaping from ears, over the head, allows the bonnet fabric to "stand off" the eyes E, thus not requiring the more elaborate mechanisms of earlier art and comprising an improvement to eye protection techniques. The mesh fabric, being multi-foraminous and in close proximity to the eye, does not hinder the animal's vision. The cape 14 is then draped over the neck, secured by Velcro® mating strips 23 to 21 to the bonnet and margin-secured underneath by connecting corresponding strips and straps 22/24, as shown. Lastly, the cape is secured to the saddle 31 by ties 26; this connection will be detailed in FIGS. 2 and 3. The rear cover 16 is draped over the rump and flanks of the horse, under a portion of the saddle 31, tethered by ties 26' to the saddle flaps 33, or cinch 35, and interconnected, under the tail T, by Velcro® tie and anchor 26T. Final to this figure is the depiction of the illuminative indicia 28 on both cape and rear cover.

Figure 3:
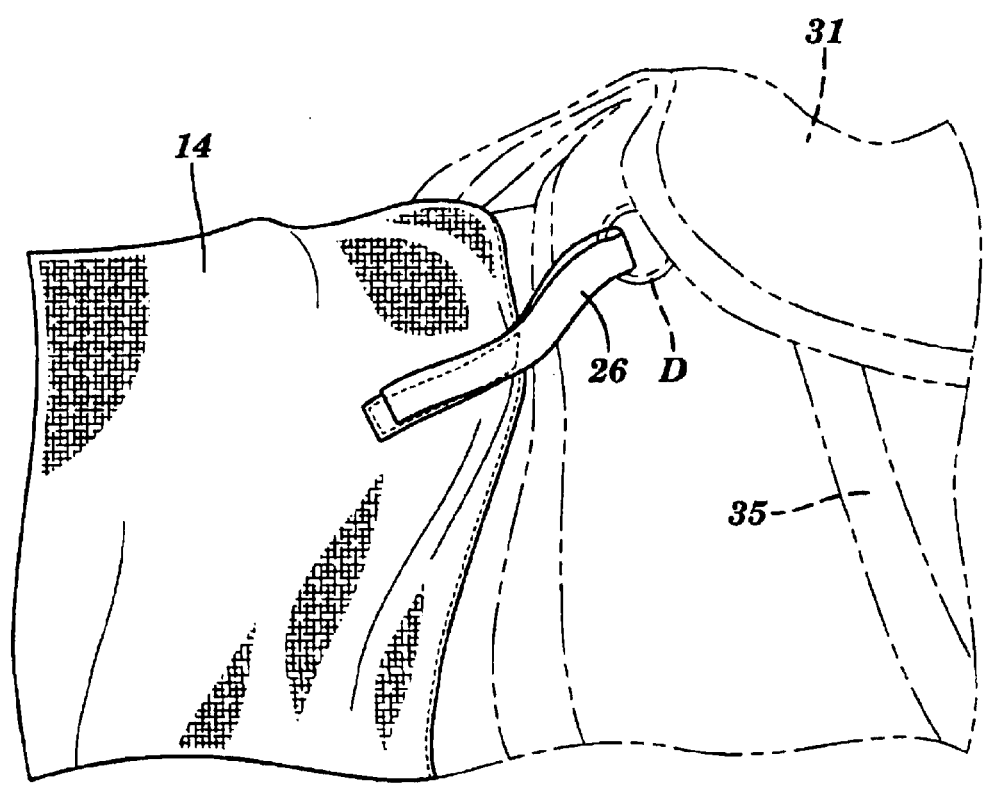
FIG. 3 is a detail of the cape or neck covering attachment to English style saddling gear.
Figure 4:
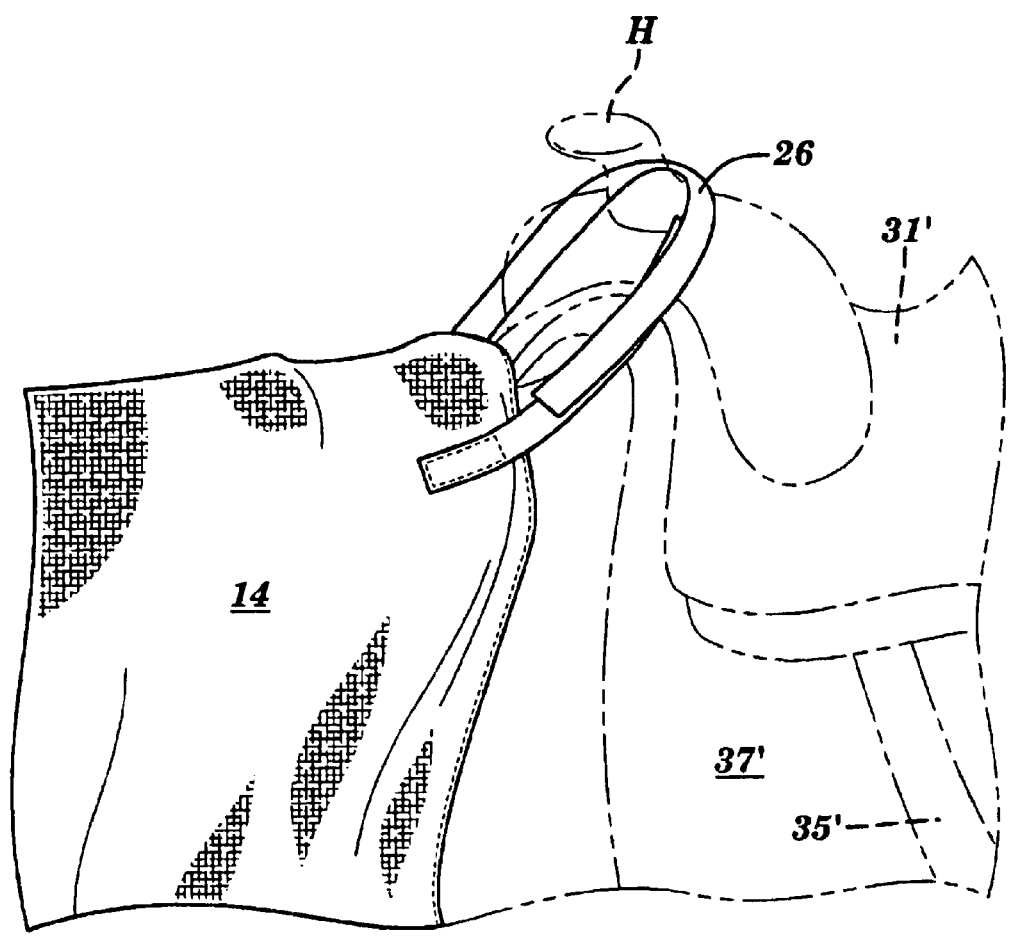
FIG. 4 is a detail of the cape or neck covering attachment to Western style saddling gear.

Turning now to FIGS. 3 and 4, front saddling gear and attachments are shown for English and Western articles, respectively. On the English gear of FIG. 3, the forward D-rings D are distinguished from the saddle horn H of the Western, FIG. 4. The remaining saddling gear, of both figures, is essentially the same except that, in His illustration only, identifying numbers of the Western gear are single-primed ('). The same Velcro® ties 26 are used by tethering each to the two D-rings in FIG. 3 or, alternately, connecting them to each other, and looping them over and around the horn H in FIG. 4.

Figure 5:
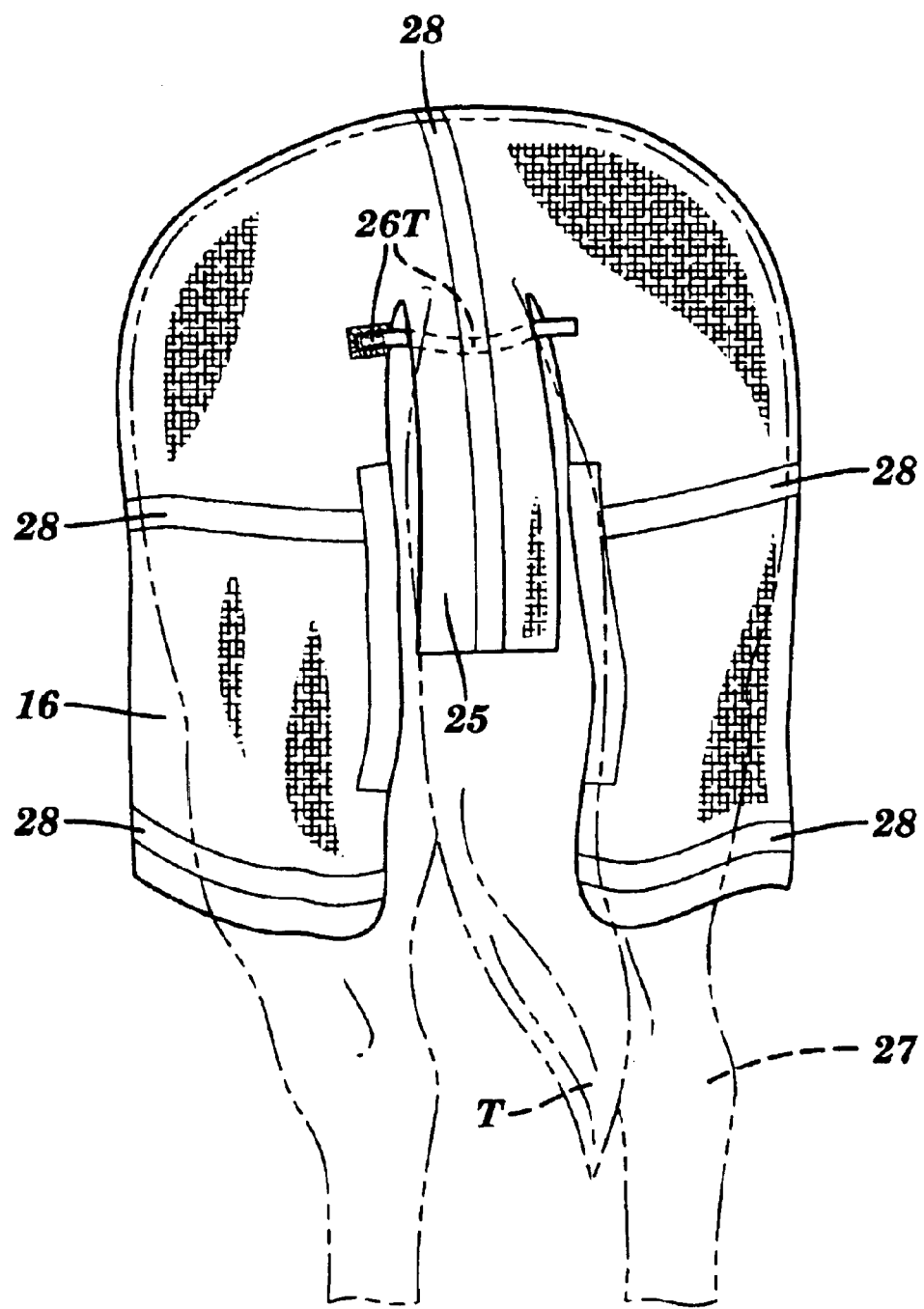
FIG. 5 is a partial rear elevation of a horse donned with the invention.

The rear cover 16, as shown in FIG. 5, gives the reader an idea of the drape of the cover over the fill rear of the horse. The one element more clearly defined in FIG. 5 is the under-the-tail tie 26T. Along with FIG. 5, a reference to FIG. 1, and the (consistently numbered) elements therein, amply illustrates the degree of covering afforded the animal's upper body. Further, the ensemble may be said to lend itself to a high degree of customization, i.e., the rear cover and neck cape may be both lengthened and widened.

Figure 6:
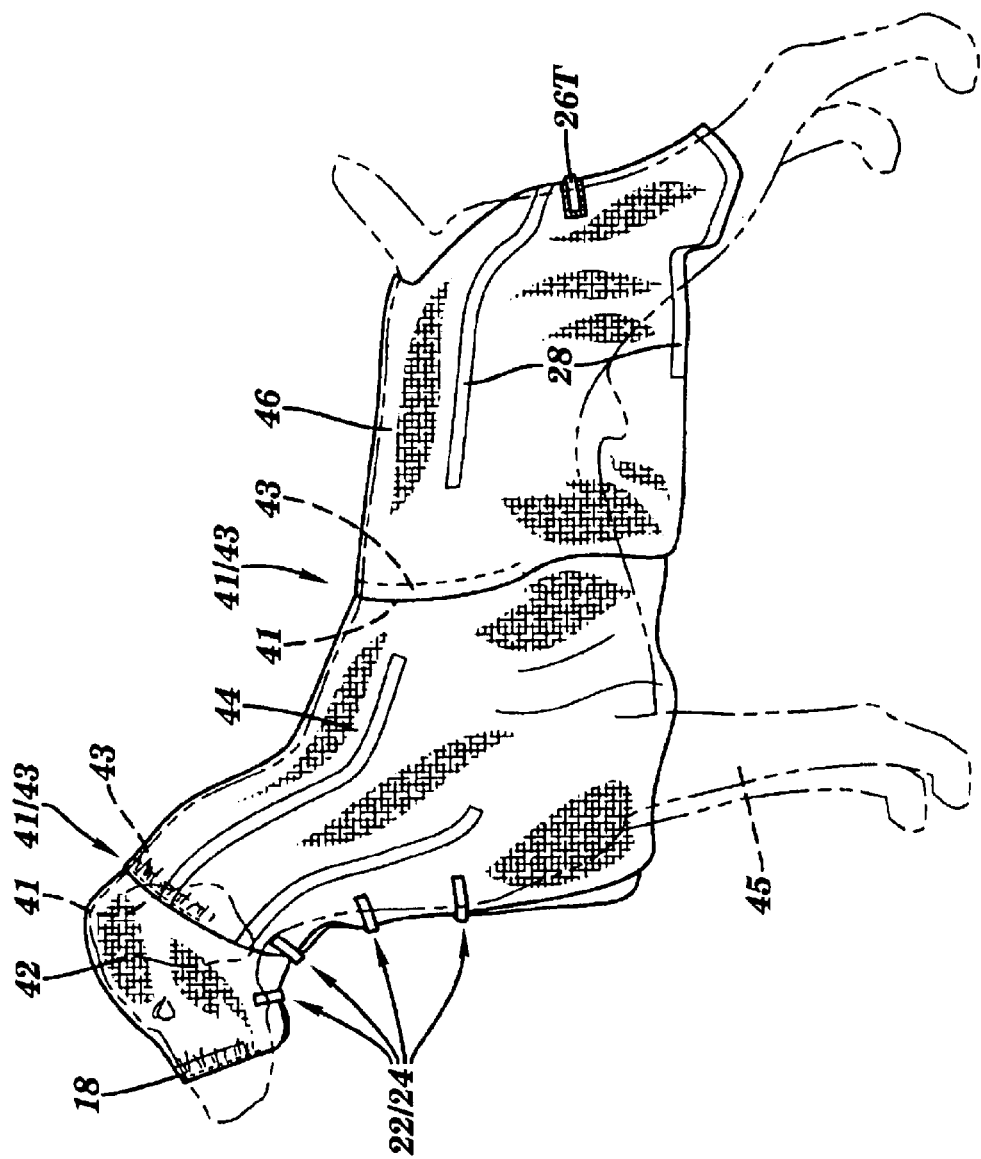
FIG. 6 is a side elevation sketch of a dog donned with the invention.

Final to the Drawings, FIG. 6 depicts the invention in an optional mode 40, fitted to a working dog 45, such as a German shorthaired pointer or similar shorthaired canine. The necessity dictated by the varied morphology of this species is one of rather high customization. Nonetheless, the basic fly protection elements: bonnet or hood 42; neck-front quarter cape 44; rear cover 46; Velcro® connections 41/43 (same mechanisms as 21/23 of FIGS. 1 and 2) and ties 22/24, as well as under-the-tail Velcro® (pair) connector 26T, provide the needed degree of utility. Optional high visibility indicia 28 are also entertained, as well as the use of brightly colored mesh fabric and elastic ties, for the various garments.

As in the case for the horse, the plurality of garments for the dog, or any working animal, may be rendered as a unit or, depending on the actual pest conditions, in a structure to cover fewer portions of the animal's body, such as head or head-neck, only.

Such variations may be made readily by those practiced in the field, to which the invention is conmmended, consistent with the hereinafter appended claims.

What is claimed is:

1. A safety and protective garment for a quadruped animal comprising:
   a plurality of lightweight, insect-resistant sections made of a breathable, optionally illuminable mesh fabric, a first of the sections disposable over a preponderance of the animal's head, a second of the sections in communication with said first of the sections and disposable over the animal's neck and an optional third of the sections disposable over a preponderance of the animal's back, flanks and rear; and
   an optional illumination indicator disposed on at least one of the first through third sections, for enhancing visibility during low visibility conditions.

2. The garment of claim 1 wherein the second and the third sections of said plurality form a unitary piece independent of the first.

3. The garment of claim 1 wherein the first and the second sections of said plurality form a unitary piece independent of the third.

4. The garment of claim 1 wherein said at least one illumination indicator is comprised of a material that radiates/reflects visible light when activated by an energy source.

5. The garment of claim 1 wherein said mesh fabric is brightly colored.

6. An insect-resistive first section of a garment comprised of a lightweight, breathable, brightly visible mesh fabric, for lending comfort and visibility to a quadruped animal, said section disposable over a preponderance of the animal's flanks and rear; and, at least one energy-excitable, illuminative safety indicator disposed on the garment.

7. The garment of claim 6 further comprising a second section that covers at least a lower neck/chest portion of the animal and communicates with said first section.

8. The garment of claim 7 wherein the first and the second sections form a unit.

9. The garment of claim 8 further comprising a third section that covers a preponderance of the head of the animal and is further integral with said unit of the first and the second sections.

10. A fly protection and identification garment, for an animal, having safety improvements characterized by one or more lightweight, insect-resistive coverings comprised of a light, moisture-venting fabric forming, optionally, a first or a second of the coverings, wherein the first is disposable over a portion of the animal's chest, and the second is communicative with said first and is disposable over a preponderance of the animal's back and flanks; the garment further characterized by a high visibility, illumination and identification indicia applied thereon.

11. The garment of claim 10 wherein only said second of said coverings forms a single use option.

12. A protection and identification garment, for an quadruped animal, having safety improvements characterized by a lightweight, insect-resistive covering comprised of a breathable fabric forming a bonnet for enclosing a portion of the head of said quadruped animal, including its eyes, and further characterized by a high visibility, identifying indicia applied thereon.

13. The garment of claim 12 wherein the covering is extended over a portion of the neck of the animal.

14. The garment of claim 13 wherein the covering is further extended over shoulders and back of the animal.

15. The garment of claim 14 wherein the animal is an unsaddled equine beast and the garment is a turnout ensemble.

16. The garment of claim 12 wherein the fabric is a mesh.

17. The garment of claim 12 wherein the fabric is a moisture-wicking material.

18. The garment of claim 12 further characterized by the inclusion of an illuminative property selected from the class of properties consisting of reflectance, fluorescence, iridescence and light emission.

* * * * *